United States Patent

Scott

[11] Patent Number: 5,865,290
[45] Date of Patent: Feb. 2, 1999

[54] CONVEYOR ROLLER INSERT

[76] Inventor: Charles Winfield Scott, 8575 Bridgewater La., Cincinnati, Ohio 45243

[21] Appl. No.: 79,749

[22] Filed: May 15, 1998

[51] Int. Cl.$^6$ .................................................. B65G 13/00
[52] U.S. Cl. ............................................................ 193/37
[58] Field of Search ............................... 193/35 B, 35 R, 193/37

[56] References Cited

U.S. PATENT DOCUMENTS

| | | | |
|---|---|---|---|
| 1,919,495 | 12/1933 | Allen | 193/37 |
| 2,135,175 | 11/1938 | Fallon | 263/6 |
| 2,696,283 | 12/1954 | Barry | 193/35 |
| 2,699,953 | 1/1955 | Chaddick | 280/79.1 |
| 3,353,644 | 11/1967 | McNash et al. | 193/37 |
| 3,610,387 | 10/1971 | Von Stein | 193/37 |
| 3,713,521 | 1/1973 | Mositake | 193/37 |
| 3,841,721 | 10/1974 | Coutant et al. | 193/37 X |
| 3,888,343 | 6/1975 | Snyder | 198/127 |
| 3,899,063 | 8/1975 | Pollard | 193/35 |
| 4,664,243 | 5/1987 | Martin | 193/37 |
| 5,421,442 | 6/1995 | Agnoff | 193/37 |

FOREIGN PATENT DOCUMENTS

| | | |
|---|---|---|
| 254043 | 5/1967 | Austria . |
| 2621021 | 3/1989 | France ...................................... 193/37 |

*Primary Examiner*—James R. Bidwell
*Attorney, Agent, or Firm*—Thompson Hine & Flory LLP

[57] ABSTRACT

A roller insert for a conveyor roller tube includes a substantially cylindrical cartridge which is shaped to be press fitted into the tube, and may be removable and replaceable. The cartridge has an outboard lip shaped to engage an outer edge of the roller tube and includes a side wall and an annularly shaped inboard backstop. A stub axle is positioned within the cartridge and has a hex shaped tip, which preferably is tapered, projecting outwardly to engage a mounting hole in a conveyor frame. Inboard and outboard bearings are provided to allow rotational movement of the cartridge relative to the stub axle and conveyor frame. The axle includes a retainer, such as a key or bead, which engages the outboard bearing to prevent overextension of the axle. A bushing is mounted on the outboard bearing to facilitate slidable movement of the axle relative to the bearings. A coil spring biasing member is mounted on the axle to urge the axle outwardly from the cartridge.

25 Claims, 2 Drawing Sheets

CONVEYOR ROLLER INSERT

BACKGROUND

This invention relates to the field of conveyor rollers and, more particularly, to devices for mounting conveyor rollers to support frames.

Conveyor systems utilizing rollers are widely used in a variety of industrial applications. In a typical configuration, a plurality of closely spaced, freely rotating rollers are mounted in parallel in an elongate support frame. The structure for rotatably mounting the rollers to the support frame is integral with the rollers. With some roller designs, inserts are mounted in the ends of the roller tube and include protrusions projecting outwardly from the ends of the tube which are received within opposing pairs of mounting holes formed in the conveyor frame. Consequently, each conveyor roller assembly is independently attachable to and removable from the conveyor support frame.

Such a structure is advantageous in terms of flexibility of design and ease of maintenance. However, a disadvantage with such a conveyor rollers is that a loose fit between the protrusions and the mounting holes can enlarge due to wear over time to the point where the protrusions may rotate in their respective mounting holes, resulting in further wear and noise. This is especially true for roller bodies having cylindrical protrusions or for rollers bearing high loads.

In order to avoid this problem, rollers have been designed using non-cylindrical protrusion shapes to prevent their rotation relative to the support frame.

Typically, these protrusions have a polygonal shape in cross section, such as a hexagonal shape. However, other shapes, such as semi-cylindrical, having a flat formed thereon, have been used. For example, U.S. Pat. No. 3,353,644 to McNash et al. discloses a conveyor roller having protruding hexagonal stub shafts for engaging correspondingly-shaped mounting holes in side rails. However, even when rollers having protrusions with eccentric shapes are used, some wear and noise results during use due to the continual vibration of the conveyor assembly. Furthermore, over time, the edges of the protrusions and the mounting holes or slots can wear to the point where rotation of the protrusion in the hole becomes possible, further adding to the wear on, and early failure of, the rollers. The repair work that is required to maintain these systems, especially when conveyor rollers wear out and fail prematurely, can be quite expensive both in labor and materials and production downtime.

To prevent this occurrence, prior art systems have used protrusions which are spring-biased and tapered so that they fit snugly into the mounting holes or slots of the conveyor frame. An example of such a configuration is shown in U.S. Pat. No. 5,421,442 to Agnoff, which discloses a conveyor roller having a central hollow shaft extending therethrough, in either side of which is mounted a spring-biased shuttle having a tapered, hex-shaped tip.

Should only one of a pair of protrusions fail, in order to minimize the maintenance expense associated with conveyor repair it is desirable to replace only that component of the roller mounting mechanism. However, with prior art rollers in which the mounting components are integral, or in which the protrusions are mounted within a single central shaft, the entire roller may have to be discarded despite the failure of only one mounting component.

Accordingly, there exists a need for a conveyor roller mounting system which includes replaceable inserts having protrusions shaped to fit securely into a mounting hole or slot on a conveyor frame, which effectively distributes the weight of the objects being conveyed, and which is capable of withstanding substantial wear before failing.

SUMMARY OF THE INVENTION

The present invention is an improved roller insert for a conveyor roller tube for rotatably mounting the roller tube in a support frame. The roller insert includes a cartridge having inboard and outboard bearings which support a stub axle having a tip projecting outwardly from the cartridge. The tip is biased outwardly by a biasing member, preferably a coil spring, mounted on the stub axle and is seated against the inboard bearing. The stub axle is mounted for slidable movement relative to the inboard and outboard bearings. A pair of such cartridges are mounted in the ends of a conveyor roller tube, and may be attached permanently or be removable and replaceable.

In a preferred embodiment of the invention, a bushing is provided on the outboard bearing and receives the axle through a central bore to facilitate sliding movement of the stub axle. The bushing includes a flange to protect the outboard bearing. Also in a preferred embodiment, the axle tip is tapered and has a non-cylindrical shape in cross section, such as a hexagonal shape, to engage a corresponding mounting hole or slot in a conveyor frame securely. Preferably, the axle has a retainer, such as a key or retaining bead, which engages the outboard bearing to limit the outward movement of the stub axle.

In an alternate embodiment of the present invention, the cartridge has a generally cylindrical side wall and the inboard bearing is seated in an annular backstop that is attached to the side wall. In this embodiment, the cartridge preferably is shaped to be press fitted into a roller tube and includes a lip for engaging an outer end of the roller tube. In an alternate embodiment, the ends of the tube are crimped over the outboard ends of the cartridge so that the cartridges are permanently attached to the tube.

Accordingly, it is an object of the present invention to provide an insert for a conveyor roller which is easily attachable to a support frame, an insert which eliminates the need for a single, unitary axle extending the length of the roller tube, an insert which distributes loading over the stub axles, an insert which is rugged and yet economical in design, and an insert which facilitates the mounting and removal of a roller from an associated support frame.

Other objects and advantages of the present invention will be apparent from the following description, the accompanying drawings and the appended claims.

DETAILED DESCRIPTION

Figure 1:
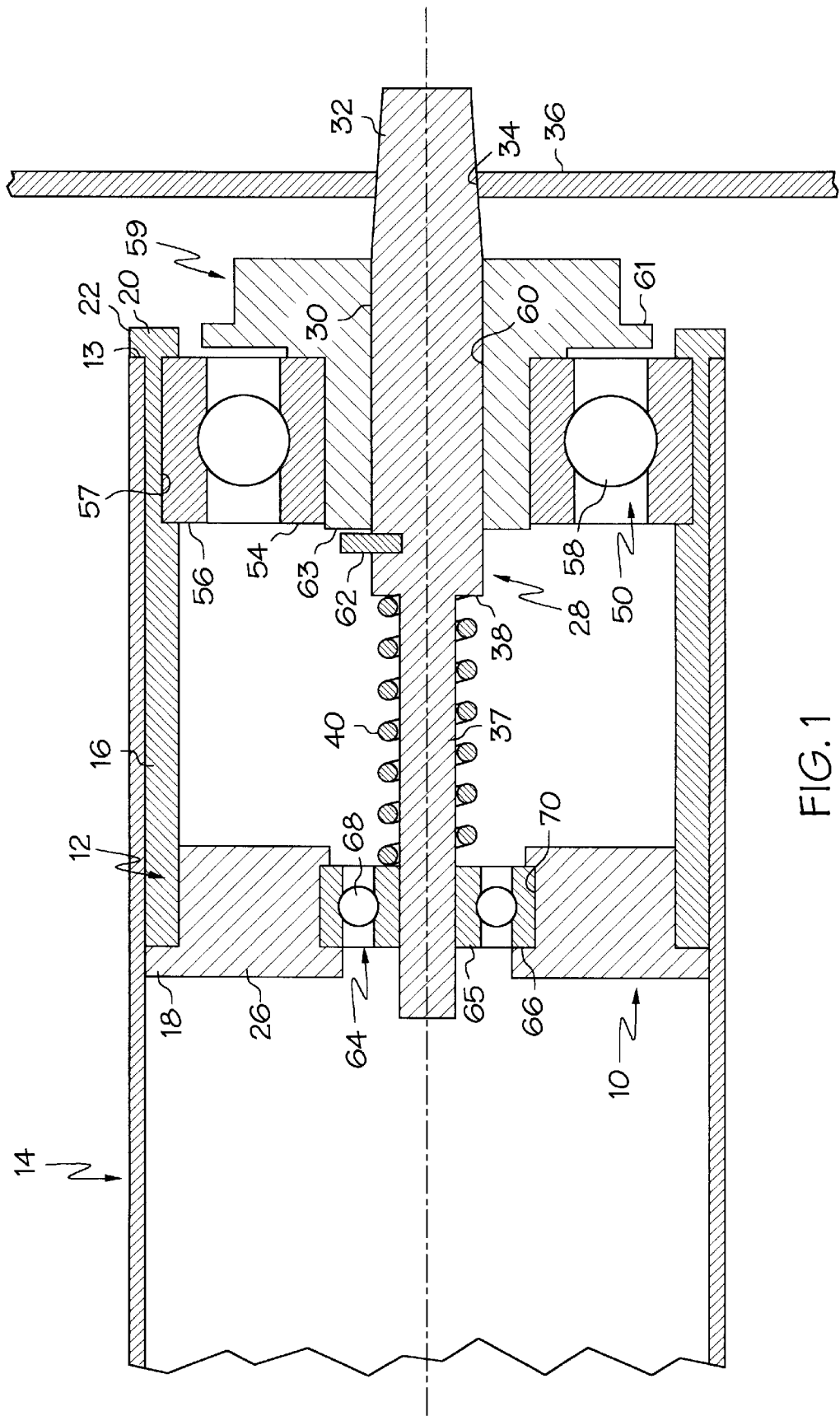
FIG. 1 is a side elevational view in section of a preferred embodiment of the conveyor roller insert of the present invention.

As shown in FIG. 1, in accordance with a preferred embodiment of the present invention, a conveyor roller insert, generally designated 10, includes a generally cylindrical cartridge 12 shaped to be press fitted into the open end 13 of a conveyor roller tube 14. The cartridge 12 includes a cylindrical side wall 16 made of a plastic material such as nylon, and inner and outer ends 18, 20. Outer end 20 includes a lip 22 formed thereon to engage and cover the open end 13 of the conveyor roller tube 14. The cartridge 12 also includes an inboard backstop 26 attached to the inner end 18 of the cartridge 12. The backstop 26 is annular in shape and is made of a plastic material, such as nylon. In the preferred embodiment, a pair of cartridges 12 are inserted into the ends of a roller tube 14.

In an alternate embodiment of the invention (not shown), the cartridge outer end does not include a lip, and is shaped so that the end 13 of the tube 14 is crimped over it. With such an embodiment, the cartridge is permanently attached to the tube.

A stub axle 28 is positioned axially within the cartridge 12 and roller tube 14. The axle 28 includes a hex-shaped tip 30 which is shaped to project outwardly from the cartridge 12 and open end 13. The tip 30 includes a tapered portion 32 to facilitate insertion in a corresponding mounting hole or slot 34 in an associated conveyor frame 36. The stub axle 28 includes a rod portion 37 which forms an inwardly-facing shoulder 38 with the base of the tip 30. The shoulder 38 forms a seat for a biasing member, preferably a coil spring 40. In an alternate embodiment (not shown), a pair of cartridges are used in which only one has a spring-loaded stub axle, while the other has a fixed stub axle which does not slide axially.

The cartridge 12 includes an outboard bearing 50 having an inner race 54, an outer race 56 and a ring of balls 58 captured therebetween. The inner race 54 is attached to a bushing 59 and the outer race 56 is seated and captured in an outboard groove 57 formed in the side wall 16 of the cartridge 12. The bushing 59 includes a central bore 60 shaped to slidably receive the tip 30 of the axle 28 therethrough, and an annular flange 61 shaped to cover and protect the outboard bearing 50.

A retainer, such as a retaining pin 62, is attached to the tip 30 adjacent to the shoulder 38, and contacts the inner end 63 of the bushing 59 to act as a limit or stop, preventing the outward travel of the stub axle 28 from the cartridge 12 beyond a preselected distance. In the alternative (not shown), a bead may be formed on the rod portion 37.

The cartridge 12 also includes an inboard bearing 64 having an inner race 65, outer race 66 and a ring of balls 68 captured therebetween. The outer race 66 is seated and captured in an inboard groove 70 formed in the inboard backstop 26. The inner race 65 of the inboard bearing 64 receives and supports the rod portion 37 of the stub axle 28 to allow slidable movement of the axle relative to the inboard bearing 64 and facilitating rotational movement of the cartridge 12 relative to the axle. The spring 40 is seated against the inboard bearing inner race 65.

Figure 2:
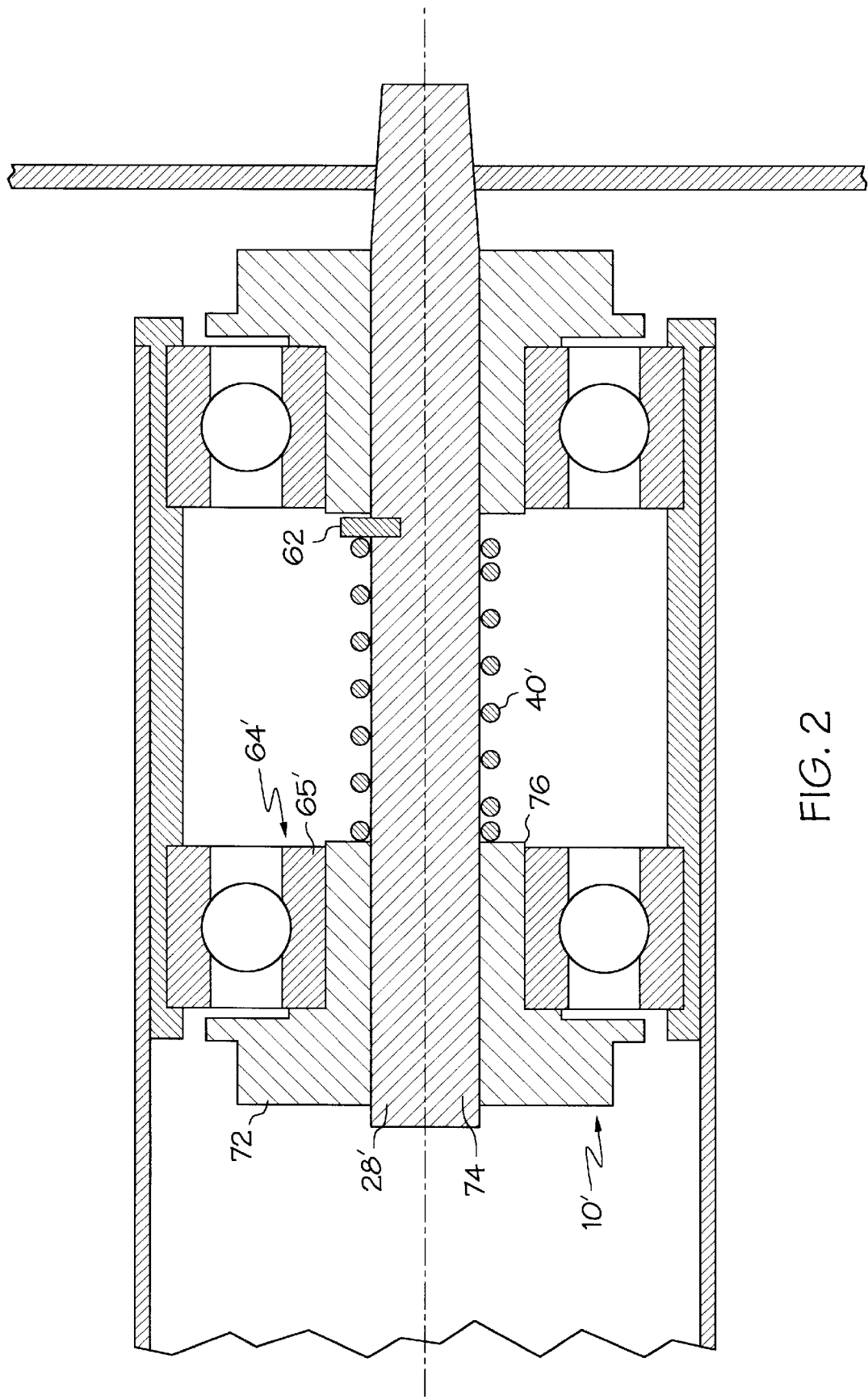
FIG. 2 is a side elevational view in section of an alternate embodiment of the conveyor roller insert of the present invention.

As shown in FIG. 2, in an alternate embodiment of the cartridge 10', the stub axle 28' is hex shaped its entire length, without a shoulder. Inboard bearing 64' includes an inboard bushing 72 attached to its inner race 65'. Bushing 72 includes a central bore 74 shaped to receive the hex shaft of the axle 28'. A biasing member, such as extension spring 40', is seated against the outer face 76 of the bushing 72 and against the pin 62. Alternately, the axle 28' could be upset at the location along its length of pin 62, and the spring 40' seated against it.

The operation of the roller insert 10 of the present invention is as follows. A pair of cartridges 12 are inserted in the ends of a conveyor roller tube 14. Each cartridge 12 is pressed into the tube 14 until the lip 22 engages tube end 13, the frictional engagement of the side wall 16 with the tube 14 firmly securing the cartridge 12 in place. A stub axle projecting tip 30 at one end is then inserted at an angle into a mounting hole 34 in conveyor frame 36. The other axle 28 projecting tip 30 is depressed inwardly against coil spring 40 and the roller tube 14 is positioned in line with an opposing mounting hole (not shown). The depressed axle 28 projecting tip 30 is then released into its mounting hole, thereby locking roller tube 14 in position for rotational movement relative to the stub axles 28 and conveyor frame 36. Loads borne by the roller tube 14 are transmitted by bearings 50, 64 to the stub axles 28 at the rod portion 37 and tip 30, and then to the frame 36. The conveyor tube 14 may be removed for repair or cartridge replacement by depressing a shuttle 28 projecting tip 30 inwardly and tilting the tube 14 out of the conveyor frame 36. It is apparent to one skilled in the art that the aforementioned procedure would apply to the embodiment 10' of FIG. 2 as well.

While the forms of apparatus herein described constitute preferred embodiments of the invention, it is to be understood that the invention is not limited to these precise forms of apparatus, and that changes may be made therein without departing from the scope of the invention.

What is claimed is:

1. A roller insert for a conveyor roller tube comprising:
   a cartridge having inner and outer ends and shaped to be inserted into an end of a conveyor roller tube;
   a stub axle positioned within said cartridge and including a tip projecting outwardly from said cartridge outer end;
   an inboard bearing mounted within said cartridge adjacent to said inner end and supporting said axle and allowing rotational movement of said cartridge relative to said axle and slidable movement of said axle relative to said inboard bearing;
   an outboard bearing mounted within said cartridge adjacent to said outer end and supporting said axle allowing rotational movement of said cartridge relative to said axle and slidable movement of said axle relative to said outboard bearing; and
   a biasing member mounted within said cartridge for urging said axle outwardly from said cartridge.

2. The roller insert of claim 1 further comprising a bushing mounted on said outboard bearing and shaped to slidably receive said stub axle therethrough.

3. The roller insert of claim 2 wherein said bushing includes a flange shaped to extend over and protect said outboard bearing.

4. The roller insert of claim 1 wherein said stub axle includes an inboard facing shoulder shaped to seat an outboard end of said biasing member.

5. The roller insert of claim 4 wherein an inboard end of said biasing member is seated against said inboard bearing.

6. The roller insert of claim 1 wherein said cartridge includes a side wall extending between said inboard and outboard bearings.

7. The roller insert of claim 6 wherein said cartridge includes an inboard backstop positioned between said side wall and said inboard bearing, for supporting said inboard bearing.

8. The roller insert of claim 1 wherein said tip is tapered to facilitate insertion into a conveyor frame.

9. The roller insert of claim 8 wherein said tip is hex shaped in cross section.

10. The roller insert of claim 1 wherein said outer end of said cartridge includes a lip shaped to engage an outer edge of said roller tube.

11. The roller insert of claim 5 wherein said biasing member includes a coil spring.

12. The roller insert of claim 11 wherein said coil spring is retained on said axle.

13. The roller insert of claim 12 wherein said stub axle includes a rod portion positioned adjacent to said inboard bearing and said spring is retained on said rod portion.

14. The roller insert of claim 13 wherein said rod portion extends in an inboard direction from said shoulder.

15. The roller insert of claim 4 wherein said inboard bearing includes an inner race slidably receives said rod portion of said shuttle.

16. The roller insert of claim 7 wherein said inboard bearing includes an outer race attached to said inboard backstop.

17. The roller insert of claim 2 wherein said outboard bearing includes an inner race connected to said bushing.

18. The roller insert of claim 6 wherein said outboard bearing includes an outer race attached to said side wall of said cartridge.

19. The roller insert of claim 1 wherein said cartridge is shaped to be press fitted into said conveyor roller tube.

20. The roller insert of claim 1 wherein said cartridge is substantially cylindrical.

21. The roller insert of claim 7 wherein said backstop is annular.

22. The roller insert of claim 1 wherein said stub axle includes a retainer for engaging said outboard bearing, thereby preventing overextension of said axle.

23. A roller insert for a conveyor roller tube comprising:

a substantially cylindrical cartridge shaped to be press fit into said conveyor roller tube having inner and outer ends and having an outboard lip shaped to engage an outer edge of said roller tube and including a side wall and an annularly shaped inboard backstop;

a stub axle positioned within said cartridge and including a hex shaped tapered tip projecting outwardly from said cartridge outer end and including an inwardly facing shoulder, a rod portion protruding inwardly from said shoulder and a retaining bead positioned on said axle to prevent over extension of said axle;

an inboard bearing mounted within said cartridge adjacent to said inner end and supporting said axle allowing rotational movement of said cartridge relative to said axle and slidable movement of said axle relative to said inboard bearing;

an outboard bearing mounted within said cartridge adjacent to said outer end and supporting said axle thereby allowing rotational movement of said cartridge relative to said axle and slidable movement of said axle relative to said outboard bearing;

a bushing mounted on said outboard bearing and shaped to slidably receive said axle therethrough, said bushing including a flange shaped to extend over and protect said outboard bearing; and a coil spring biasing member mounted on said rod portion of said axle thereby urging said axle outwardly from said cartridge and having an inboard end an outboard end, wherein said inboard end of said biasing member is seated against said inboard bearing and said outboard end is seated against said shoulder.

24. The roller insert of claim 1 wherein said tip is eccentrically shaped to mate with a corresponding mounting hole or slot in a conveyor frame and prevent rotation therewithin.

25. The roller insert of claim 23 wherein said tip shape is polygonal.

* * * * *